United States Patent
Obeda et al.

(10) Patent No.: US 7,127,165 B2
(45) Date of Patent: Oct. 24, 2006

(54) METHOD AND SYSTEM FOR COMPENSATING FOR SIDE EFFECTS OF CROSS GAIN MODULATION IN AMPLIFIED OPTICAL NETWORKS

(75) Inventors: Paul David Obeda, Ottawa (CA); Robert Michael Bierman, Ottawa (CA); James Benson Bacque, Ottawa (CA); Colin Geoffrey Kelly, Ottawa (CA); Derrick Remedios, Ottawa (CA); Ping Wai Wan, Ottawa (CA)

(73) Assignee: Tropic Networks Inc., Kanata (CA)

( * ) Notice: Subject to any disclaimer, the term of this patent is extended or adjusted under 35 U.S.C. 154(b) by 671 days.

(21) Appl. No.: 10/628,418

(22) Filed: Jul. 29, 2003

(65) Prior Publication Data
US 2004/0196534 A1    Oct. 7, 2004

Related U.S. Application Data

(60) Provisional application No. 60/447,726, filed on Feb. 19, 2003.

(51) Int. Cl.
*H04B 10/08*    (2006.01)
(52) U.S. Cl. .......................................... 398/32; 398/79
(58) Field of Classification Search .................. 398/79, 398/193, 19, 8, 212, 31, 32, 1, 83, 9; 375/340, 375/208, 376; 359/337, 12; 385/2, 4, 8; 379/220, 229; 370/465, 529; 455/71
See application file for complete search history.

(56) References Cited

OTHER PUBLICATIONS

Pedersen et al., WO 99/33200 A (DSC Communications AS (DK)) Jul. 1, 1999.*

Hill, G.R., et al, "A Transport Network Layer Based on Optical Network Elements", Journal of Lightwave Technology, 1993, pp. 667-676.

\* cited by examiner

*Primary Examiner*—David C. Payne
(74) *Attorney, Agent, or Firm*—Victoria Donnelly

(57) ABSTRACT

A method and system for compensating for side effects of cross gain modulation in amplified optical networks, which allows reliable identification of expected and unexpected channels in the network is provided. Each optical channel traveling in the optical network is marked with a unique channel signature (expected channel signature), having one or more dither tone modulated onto the optical channel; followed by detecting a spectrum of tones, including said modulated dither tones and ghost tones thereof produced by the cross gain modulation in the optical network, at various locations in the optical network. Amplitudes of the spectrum tones, which belong to the expected channel signature, are compared with a first threshold, while amplitudes of the remaining spectrum tones, which are not the valid tones, are compared with a second threshold, which is lower than the first threshold. The spectrum tones are identified as valid tones if their amplitudes are above the first threshold; and an alarm signaling that the expected channel signature is missing is generated if the amplitude of the spectrum tone is below the first threshold. Yet another alarm is generated signaling that an unexpected channel is detected in the network if the amplitude of at least one of the remaining spectrum tones is exceeding the second threshold. Alternatively, the other alarm is generated if amplitudes of the remaining spectrum tones belonging to one of the allowable channel signatures in the network are above the second threshold. A corresponding system incorporating the step of the methods described above is also provided.

13 Claims, 3 Drawing Sheets

METHOD AND SYSTEM FOR COMPENSATING FOR SIDE EFFECTS OF CROSS GAIN MODULATION IN AMPLIFIED OPTICAL NETWORKS

RELATED APPLICATION

This application claims benefit from U.S. Provisional Patent Application Ser. No. 60/447,726 to Obeda, P. D., et al, entitled "Method and Apparatus for Compensating for Side Effects of Cross Gain Modulation in Amplified Optical Networks", and filed on 19 Feb. 2003.

FIELD OF THE INVENTION

The invention relates to fiber optic networks, and in particular, to method and system for compensating for side effects of cross gain modulation in amplified optical networks.

BACKGROUND OF THE INVENTION

As communications networks become more complex, the task of network management becomes increasingly difficult. An important aspect of network management is an identification and accurate record of optical channels in the network, and knowledge of the allocation of channels to the network elements, e.g., to optical links. This may involve knowledge of the allocation of channels to respective optical fibers and optical band filters within the nodes.

One of the common methods for the identification of a channel in an optical network is to modulate the channel with a low frequency tone (dither tone), where the tone uniquely identifies the channel wavelength in the network. A network management system (NMS) associated with network nodes is responsible for mapping each channel with a unique tone, and for keeping track of tones available for channel identification.

In this method, each channel is individually modulated with the dither tone at or near its source, but detection of channels within a wavelength division multiplexed (WDM) optical signal can be performed by demodulating the aggregate signal (without demultiplexing into individual wavelengths) and detecting the spectrum of tones, for example using a Fast Fourier Transform (FFT). This makes it economical to determine the presence of channels in WDM signals at various points in the network.

Channel identification serves primarily two purposes: the confirmation of the presence of a channel at points in the network where the channel is expected to be present; and confirmation of the absence of a channel where the channel is not expected to be present. Faults in the optical switching and transmission equipment that make up the network may have the effects of disrupting the transmission of a channel, or switching it incorrectly. The system of channel identification deployed throughout the network thus enables the NMS to detect and locate such faults.

A method suitable for identification of channels in larger optical networks is described in the pending U.S. patent application Ser. No. 10/259,290 to Obeda et al., entitled "METHOD AND SYSTEM FOR IDENTIFICATION OF CHANNELS IN AN OPTICAL NETWORK" filed Sep. 10, 2002.

Briefly recapitulated, the aforementioned method provides several embodiments for identifying optical channels in large optical networks by means of a channel signature. The channel signature of an optical channel consists of two or more low frequency tones (dither tones) modulated upon the optical channel.

Methods for modulating and reliably detecting dither tones are described in another U.S. pending application Ser. No. 09/972,991 to Wan et al., entitled "CHANNEL IDENTIFICATION IN COMMUNICATIONS NETWORKS" filed Oct. 10, 2001.

In optical networks, optical amplifiers provide for the amplification of the WDM (Wavelength Division Multiplex) optical signals which include the dither tones. While the optical amplifiers are capable of amplifying the multi-wavelength optical signal as a whole, one side effect of this amplification is cross talk of the low-frequency dither tones between the wavelength channels.

As a result of this cross talk, the identification of channels down stream of such amplification points in the network is rendered more difficult, because the tones constituting a channel signature belonging to a particular wavelength channel may also appear (in attenuated form) on other channels.

The effect of cross talk among the modulated WDM channels in an optical amplifier is termed "cross gain modulation" (XGM), and is described in detail in an article entitled "A Transport Network Layer Based on Optical Network Elements" by G. R. Hill et al in Journal of Lightwave Technology, 1993, pp. 667–676.

The effect of XGM on the channel identification method based on the decoding of dither tones is briefly demonstrated with the help of FIG. 1 illustrating a number of spectrum views of tones one might expect to observe in an optical network 10. The diagram of spectrum views (tone spectra) of FIG. 1 is organized as four rows and three columns. In the first three rows are shown tone spectra of individual wavelength channels $\lambda 1$ (spectra 12, 14, and 16), $\lambda 2$ (spectra 18, 20, and 22), and $\lambda 3$ (spectra 24, 26, and 28), the fourth row shows the aggregate tone spectra that would be observed on the WDM (multiplexed) optical channel as a whole, i.e. $\lambda 1+\lambda 2+\lambda 3$ (spectra 30, 32, and 34).

Spectral lines in each of the tone spectra appear at one or more frequency points, labeled in spectrum 30 as f1, f2, and f3, and applying analogously in all other spectra of FIG. 1. In this simple example, a tone of frequency f1 is used for identifying $\lambda 1$, f2 identifies $\lambda 2$, and f3 identifies $\lambda 3$.

Inserted between the aggregate tone spectra (30, 32, and 34) are symbols indicating stages of the network 10 processing the optical signal, i.e. an optical amplifier 36, and a drop-channel module 38.

In the first column of spectra each of the individual channel spectra (spectra 12, 18, and 24) contains a single spectral line representing the tone assigned to that channel, a line at frequency f1 corresponding to $\lambda 1$, and so on. The aggregate spectrum 30 contains the sum of the individual spectra 12, 18, and 24, that is spectral lines at f1, f2, and f3.

The spectra of the second column (14, 20, 26, and 32) represent spectra after the optical signal has passed through the optical amplifier 36.

Each of the individual channel spectra (spectra 14, 20, and 26) contains the original spectral line representing the tone assigned to that channel, as well as spectral lines representing the tones from all other wavelength channels that pass through the amplifier 36 as part of the WDM signal. These other (unwanted) spectral lines, also termed "ghosts" or "ghost tones", are caused by the XGM effect mentioned above. The aggregate spectrum 32 contains the sum of the individual spectra 14, 20, and 26, indicating the presence of wavelength channels $\lambda 1, \lambda 2,$ and $\lambda 3$. Note that at this point the effect of XGM is not discernible in the aggregate spectrum 32 (apart from second order effects with which we are not currently concerned).

The spectra of the third column (16, 22, 28, and 34) represent spectra after the optical signal passes through the channel-drop module 38. We assume here that the channel-drop module 38 has ideal behavior and removes the wavelength channel $\lambda 3$ completely.

The spectra 16 and 22 after the channel-drop module 38 are unchanged from the spectra 14 and 20 respectively before the channel-drop module 38. The spectrum 28 contains no spectral line since the signal at the wavelength $\lambda 3$ has been dropped. The aggregate spectrum 34 contains the sum of the individual spectra 16, 22, and 28. Note the presence of two strong spectral lines at frequency points f1 and f2 in the aggregate spectrum 34, indicating the presence of wavelength channels $\lambda 1$ and $\lambda 2$. A third, shorter spectral line 35 at frequency point f3 is the result of ghosts representing wavelength channel $\lambda 3$, contributed by the ghost tones 11 and 13 of both the wavelength channels $\lambda 1$ and $\lambda 2$. In other words, even though the wavelength channel $\lambda 3$ is not present in the optical signal, the ghost at f3, present in the aggregate spectrum 34 due to the effect of XGM, could be mistaken as an indicator of the presence of the wavelength channel $\lambda 3$.

Thus, the presence of ghost tones due to XGM may compromise the accuracy of channel identification in optical networks, especially larger optical networks with many optical amplifiers, and networks with a large number of wavelength channels and a large number of tones, including networks using multiple tones as channel signatures. This effect is cumulative, i.e. the amplitude of ghost tones increases with each amplifier stage passed by the signal.

Accordingly, there is a need in industry for the development of a method and system to compensate for side effects of XGM in amplified optical networks, which would enable accurate channel identification in optical networks.

SUMMARY OF THE INVENTION

Therefore there is an object of the invention to provide an improved method and system which would compensate for side effects of cross gain modulation in amplified optical networks, thus reducing and/or obviating shortcomings of the prior art.

According to one aspect of the invention there is provided a method for compensating for side effects of cross gain modulation in amplified optical networks, comprising the steps of:

(a) marking an optical channel traveling in the optical network with a unique channel signature (expected channel signature), comprising at least one dither tone modulated onto the optical channel;

(b) detecting a spectrum of tones, including said modulated dither tone and ghost tones thereof produced by cross gain modulation in the optical network, at various locations in the optical network;

(c) comparing amplitudes of the spectrum tones, which belong to the expected channel signature, with a first threshold:

(d) identifying the spectrum tone as a valid tone if the amplitude of the spectrum tone is exceeding the first threshold;

(e) generating an alarm that said expected channel signature is missing if the amplitude of the spectrum tone is below the first threshold; and (f) comparing amplitudes of the remaining spectrum tones, which are not the valid tones, with a second threshold, the second threshold being lower than the first threshold:

(g) generating another alarm that an unexpected channel is detected in the network if the amplitude of at least one of the remaining spectrum tones is exceeding the second threshold.

Conveniently, the step of marking comprises marking the optical channel with the unique channel signature comprising two or more dither tones modulated onto the optical channel. The step (d) of identifying the spectrum tone as the valid tone comprises identifying the spectrum tone as the valid tone only if the amplitude of all spectrum tones belonging to the expected channel signature is above the first threshold. The step (e) of generating the alarm comprises generating the alarm that said expected channel signature is missing if the amplitude of at least one of the spectrum tones belonging to the expected channel signature is below the first threshold.

The method may further comprise the step of maintaining a list of all available channel signatures in the optical network, including the expected channel signatures being used in the optical network and/or the step of keeping track of expected network locations associated with the expected channel signatures. In this situation, the step (g) of generating another alarm conveniently comprises generating another alarm only if the amplitude of all spectrum tones belonging to one of the available channel signatures in the optical network is above the second threshold, and the step (d) comprises identifying the spectrum tone as the valid tone only if the valid tone is detected at the expected network location.

Conveniently, the step (c) of comparing comprises comparing amplitudes of spectrum tones, which belong to the expected channel signature, with the first threshold, whose value is static, while the step (f) of comparing comprises dynamically calculating a value of the second threshold as a function of the optical network parameters and parameters of the detected spectrum of tones, e.g. as the function of the identified valid tones in the detected spectrum of tones and a number of optical amplifiers along paths of the valid tones in the optical network.

According to another aspect of the invention there is provided a system for compensating for side effects of cross gain modulation in amplified optical networks, comprising:

(a) means for marking an optical channel traveling in the optical network with a unique channel signature (expected channel signature), comprising at least one dither tone modulated onto the optical channel;

(b) means of detecting a spectrum of tones, including said modulated dither tone and ghost tones thereof produced by the cross gain modulation in the optical network, at various locations in the optical network;

(c) means for comparing amplitudes of the spectrum tones, which belong to the expected channel signature, with a first threshold:

(d) means for identifying the spectrum tone as a valid tone if the amplitude of the spectrum tone is exceeding the first threshold;

(e) means for generating an alarm that said expected channel signature is missing if the amplitude of the spectrum tone is below the first threshold; and (f) means for comparing amplitudes of the remaining spectrum tones, which are not the valid tones, with a second threshold, the second threshold being lower than the first threshold:

(g) means for generating another alarm that an unexpected channel is detected in the network if the amplitude of at least one of the remaining spectrum tones is exceeding the second threshold.

Beneficially, the means (f) for comparing amplitudes of the remaining tones comprises means for dynamically calculating a value of the second threshold as a function of the optical network parameters and parameters of the detected spectrum of tones.

The embodiments of the invention provide a system and method to effectively deal with the side effects of XGM to identify between expected and unexpected channels in the optical network. Due to the use of the dynamic unexpected tone threshold, which adapts automatically to the level of the actual valid tones of the expected channels, such identification becomes more robust, thus enabling more accurate channel identification in optical networks.

BRIEF DESCRIPTION OF THE DRAWINGS

Embodiments of the invention will now be described by way of example, with reference to the accompanying drawings in which.

DETAILED DESCRIPTION OF THE EMBODIMENTS OF THE INVENTION

Figure 1:
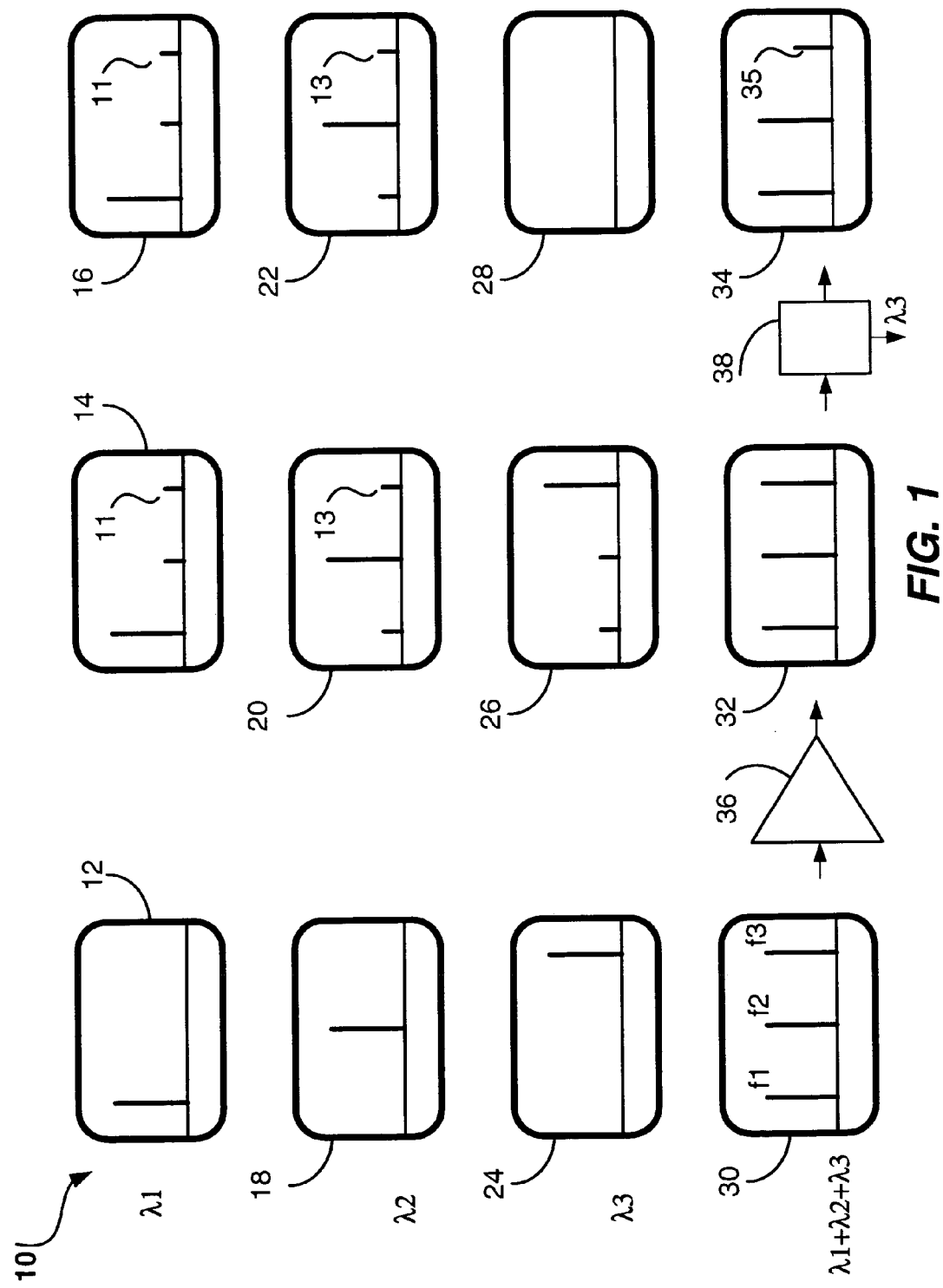
FIG. 1 illustrates the effect of cross gain modulation (XGM) in an optical network.

In an optical network used for illustrating methods for compensating for side effects of cross gain modulation according to the embodiments of the invention, a distinct combination of two or more dither tones is modulated upon each individual wavelength channel as a channel signature. Channels of different wavelength are routed through the network from node to node where they may be multiplexed, demultiplexed, added or dropped, switched, and amplified. Regardless of the specific network routing topology, channel signature decoders are placed in the network to track and identify the channels. These channel signature decoders are coupled to the multiplexed optical (WDM) signals, each channel signature decoder designed to decode all channels signatures present in any of the channels comprising the optical signal, i.e. without wavelength demultiplexing.

The network of the embodiment of the invention is under the control of a network management system (NMS), one purpose of which is to ensure the wavelength channels are routed correctly. As part of this task, the NMS communicates with the channel signature encoders for the purpose of setting the frequencies of the channel signature tones, and with the channel signature decoders, placed at various points in the network, to verify the presence of each channel at each point where it is expected, and to verify that no unexpected channels exist at these points. Numerous possible faults in the network may have the consequence of interrupting or misrouting a channel; one of the tasks of the NMS is to detect such a fault if it occurs and raise an alarm. To fulfill this task, the NMS periodically scans the channel signature decoders to confirm that all expected channel signatures are present (no missing channels), as well as to ensure that no unexpected channel signatures are present (no unexpected channels) at the various points in the network.

An exemplary network 100 is used for illustrating methods for compensating for side effects of cross gain modulation in amplified optical networks according to the embodiments of the invention. The network 100 is understood to be merely a representative part of a larger network containing many more nodes (encoders, amplifiers, decoders) and links. The larger network also has a network management system (not shown) used to distribute channel signatures from a catalog of available channel signatures to encoders, and to interrogate decoders for the detection of wavelength channels throughout the network, as already explained in the background section above.

The network 100 includes a first source of wavelength channels with channel signature encoders "ENC1" 110 having a WDM signal output 115; a second source of wavelength channels with channel signature encoders "ENC2" 120 having a WDM signal output 125; a first chain 130 of A (1 . . . A) amplifiers; a second chain 140 of B (1 . . . B) amplifiers; a combiner "COMB" 150; a third chain 160 of C (1 . . . C) amplifiers; an optical tap "TAP" 170 with a tapped-signal output 175; and a wavelength channel decoder 180. All amplifiers are of the EDFA type. The purpose of FIG. 100 is to illustrate the path topology used in the calculation of the dynamic unexpected tone threshold in the decoder 180.

The WDM signal output 115 of the ENC1 110 is coupled to the first chain of amplifiers 130. The WDM signal output 125 of the ENC2 120 is coupled to the second chain of amplifiers 140. The outputs of the first and second chains of amplifiers (130 and 140) are combined in the combiner 150, the combined signal being amplified by the third chain of amplifiers 160. The output of the third chain of amplifiers 160 is coupled to the optical tap 170. The tapped signal output 175 of the optical tap 170 is coupled to the decoder 180.

The WDM signal generated in the encoder ENC1 110 comprises a first group of M wavelength channels, each having a wavelength signature comprising two or more tones. Similarly, the WDM signal generated in the encoder ENC2 120 comprises a second group of N wavelength channels, each having a wavelength signature comprising two or more tones, where the wavelengths as well as the tones of the wavelength signatures of all channels in both the first and second group of wavelength channels, are distinct.

The path from the ENC1 110 to the decoder 180 thus includes M channels passing through A and C amplifiers. The path from the ENC2 120 to the decoder 180 includes N channels passing through B and C amplifiers. The number of expected channel signatures at the decoder 180 is M+N.

The methods for compensating for side effects of cross gain modulation of the embodiments of the invention provide generation of two different thresholds at each decoder, against which the amplitude of channel signature tones is compared, one threshold for expected tones to be referred to as an "expected tone threshold", and another threshold for ghosts, or unexpected tones, to be referred to as an "unexpected tone threshold".

The expected tone threshold is predetermined in a known manner by the planning tool used to design the network, and is linked to the expected tone amplitude. For example if the signal amplitude of expected tones is +3 dBm, the expected tone threshold may be set 32 dB lower, that is at −29 dBm.

The unexpected tone threshold is derived dynamically at each decoder. This threshold is a function of the actually received signal amplitudes of the tones of correctly detected expected channel signatures and the number of EDFA amplifiers in the paths of the expected tones.

The methods for the embodiments of the invention will be described in more detail with regard to the flow chart 200 of FIG. 3, the methods being performed at the decoder 180 shown in FIG. 2. The methods include the following steps: measure the amplitude of all tones (step 210); determine expected channel signatures (step 220); determine valid tones (step 230); calculate dynamic unexpected tone threshold (step 240); determine unexpected channel signatures (step 250); and report results to the network management system (step 260).

The step 210 of measuring the amplitude of each tone in the range of frequencies used for channel signatures (the "tonespace") is conveniently implemented using a Fast Fourier Transform (FFT) method.

The step 220 of determining the presence of expected channel signatures is carried out by comparing the amplitudes of the tones of all expected channel signatures with an expected tone threshold. The expected channel signatures are determined statically from the network topology, for example those tones comprising the channel signatures of the M+N channels encoded in ENC1 and ENC2 of FIG. 2. The expected tone threshold is statically determined. A network planning tool, for example used in planning the network and its links, may have predetermined all planned WDM signal levels and tone levels in the network. The "expected tone threshold" is set at a convenient level below the planned tone level. For example, an expected tone threshold 15 dB below the planned tone level may be used, meaning that a tone signal that is more than 15 dB below the planned tone level is ignored, while a measured tone signal with a level above the expected tone threshold is considered to be an expected tone and included in the subsequent steps of the method.

The step 230 of determining valid tones is to ensure that at least two tones of the tones comprising each expected channel signature are present, i.e. exceed the expected threshold in amplitude. Any expected channel signature that is not represented by at least two of its tones (exceeding the expected tone threshold) is considered to be missing, that is the wavelength channel corresponding to the expected channel signature is considered to be not present, and a "MISSING CHANNEL" report is generated and sent to the step 260. Valid tones are all tones which belong to expected channel signatures, and where at least two tones of the channel signature are present.

The step 240 of calculating the dynamic unexpected tone threshold calculates the unexpected tone threshold based on the measured amplitudes of all valid tones and of the number of amplifiers in the path of each of the valid tones.

The general formula used in computing the dynamic unexpected tone threshold "TU" according to the first embodiment is as follows:

$$TU = 10 \cdot \log\left(\sum_{i=1}^{Z} V_i \cdot E_i\right) - \text{OFFSET} \quad (1)$$

where i=1 to Z, $V_i$ is the measured amplitude of the i-th valid tone, $E_i$ is the number of EDFA amplifiers in the path of the i-th valid tone, and Z is the number of valid tones.

The value of OFFSET depends on the frequency range of the tones used in channel signatures, and on the characteristics of the EDFA amplifiers used. In the network of the preferred embodiment the value of OFFSET is 32 dB, based on a range of tone frequencies ("tonespace" in the US application to Obeda cited above) from about 48 kHz to about 64 kHz, and the XGM characteristics of amplifiers, e.g., from different manufacturers, or employing different control mechanisms.

Figure 2:
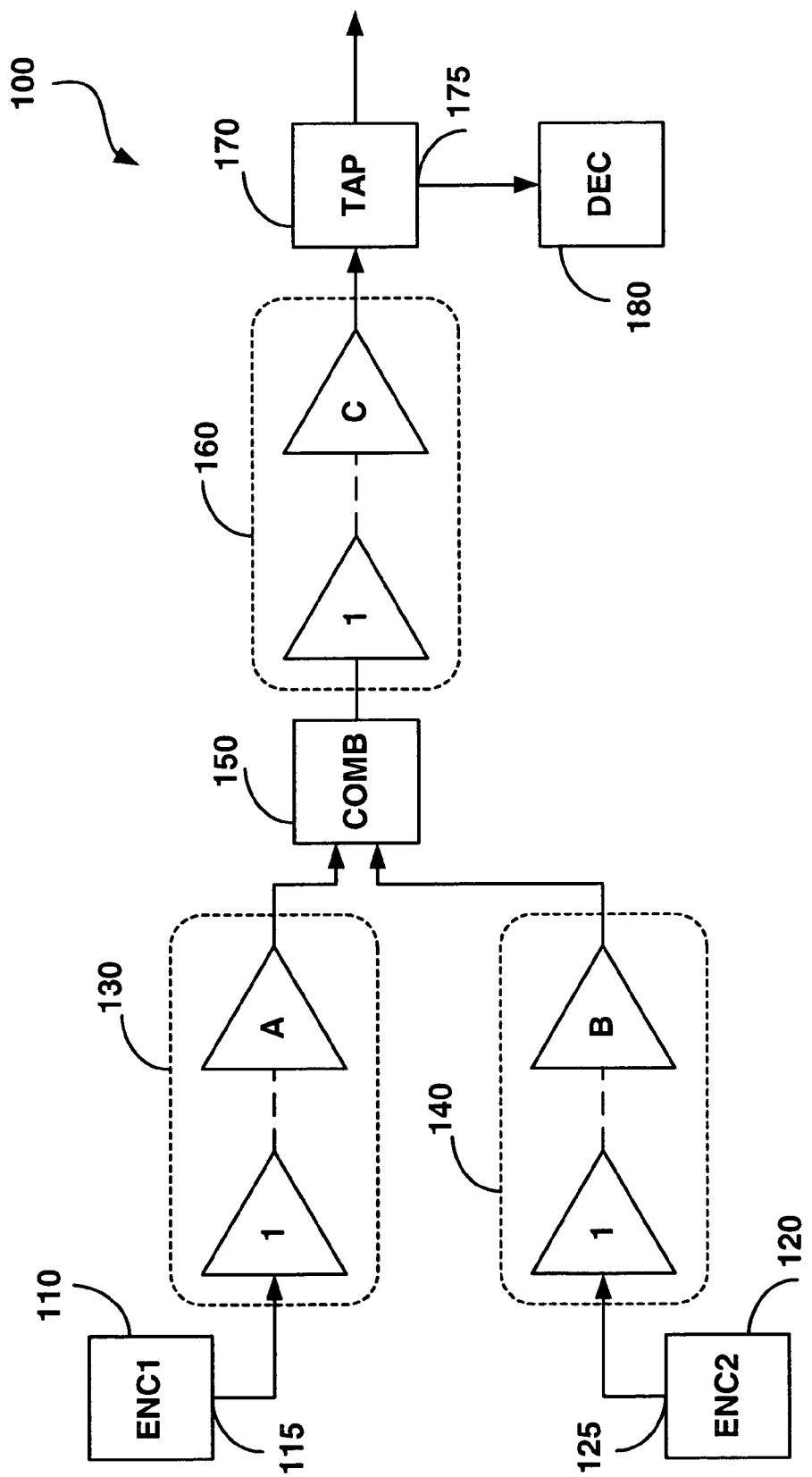
FIG. 2 shows an exemplary optical network used for illustrating methods for compensating for side effects of cross gain modulation according to the embodiments of the invention.
Figure 3:
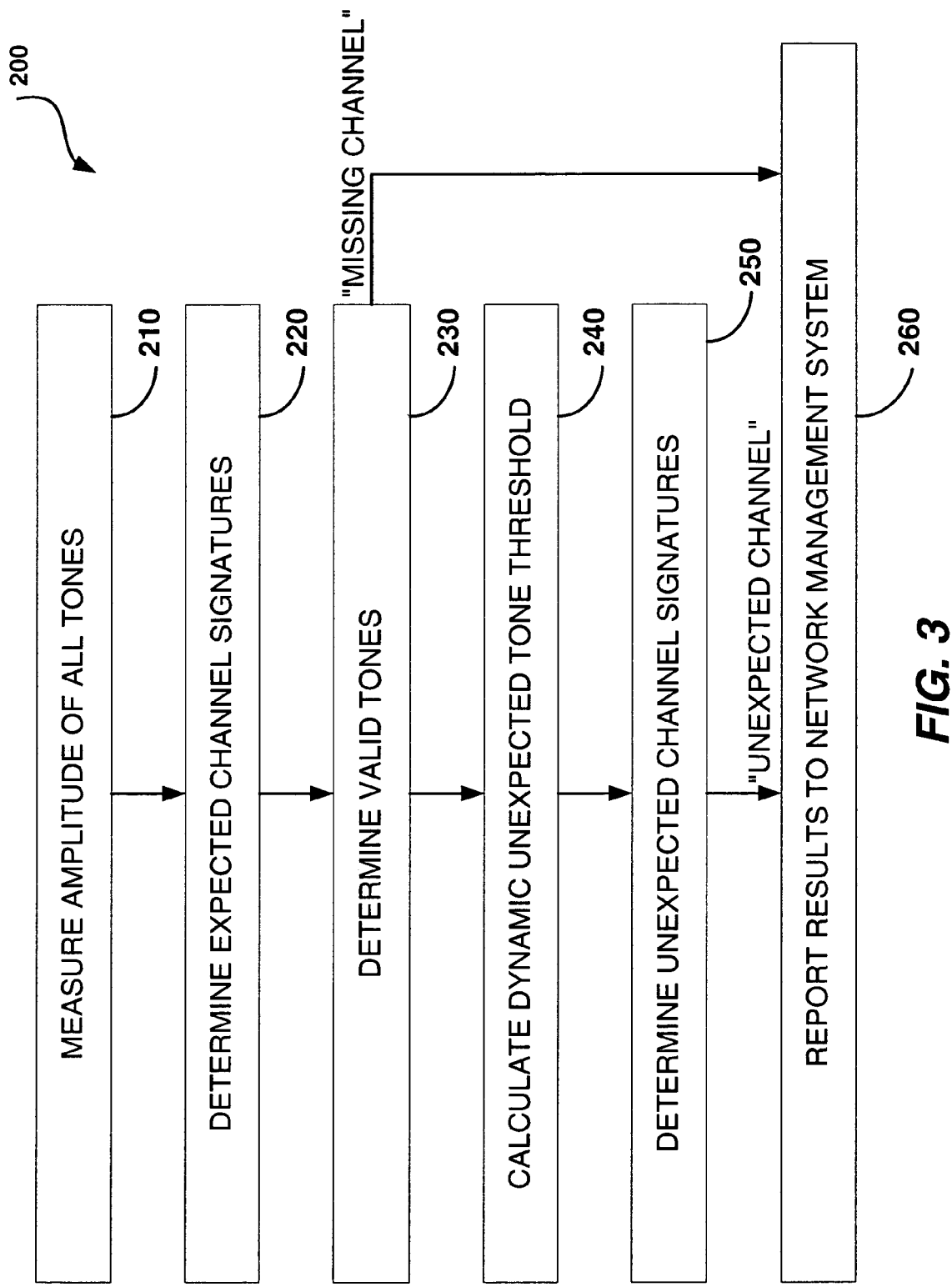
FIG. 3 is a flow chart illustrating steps of the methods for compensating for side effects of cross gain modulation of the embodiments of the invention performed by the decoder 180 of FIG. 2.

In the second embodiment, the formula (1) is being adapted to become more efficient for computation of the unexpected tone threshold in such cases as the example network of FIG. 2, where there are a small number of groups of channels from multi-channel sources (ENC1 and ENC2), and where there are chains of amplifiers common to groups of channels.

The unexpected tone threshold of the decoder 180 of the network 100 in FIG. 2, using the preferred value for OFFSET, may be calculated as follows:

$$TU = 10 \cdot \log\left(\sum_{i=1}^{Z_M} V_i \cdot (A+C) + \sum_{j=1}^{Z_N} V_j \cdot (B+C)\right) - 32 \quad (2)$$

where i=1 to $Z_M$, j=1 to $Z_N$, $Z_M$ is the number of valid tones corresponding to the channel signatures of the M wavelength channels from the encoder ENC1 110; and $Z_N$=the number of valid tones corresponding to the channel signatures of the N wavelength channels from the encoder ENC2 120.

The step 250 of determining the presence of unexpected channel signatures includes comparing all other remaining tone amplitudes (i.e. those tones within the tonespace excluding the valid tones from step 230) with the dynamic unexpected tone threshold. The result is a list of unexpected tones. If any unexpected tones belong to an unexpected channel signature, this may indicate the presence of an unexpected wavelength channel, and result in an "UNEXPECTED CHANNEL" report being generated and sent to step 260. An unexpected channel signature is any channel signature from the catalog of legitimate channel signatures of the larger network, excluding the expected channel signatures.

The choice of the value of OFFSET=32 in the formula for calculating the dynamic unexpected tone threshold is made to ensure a high likelihood of detecting misconnected channels, but in order to reduce the probability of false "unexpected channel" alarms, all tones of a legitimate tone combination (of an unexpected channel signature) should exceed the unexpected tone threshold before an alarm is indicated.

On the other hand, the requirement that at least two expected tones (of the two or more tones used for channel signatures) be present and exceed the expected tone threshold, is designed to provide a more robust indication of the usually correct expected channel indication; a "MISSING CHANNEL" alarm is only generated if only one or none of the expected tones of an expected channel signature is valid.

The use of the dynamic unexpected tone threshold, adapting automatically to the level of the actual valid tones of the expected channels, provides much better discrimination against falsely triggering alarms on XGM induced ghost tones than a fixed threshold would provide.

The embodiments of the invention thus provide a system and method to effectively deal with the side effects of XGM, thus enabling more accurate channel identification in optical networks.

In the embodiments described above in detail, the detector calculated a single dynamic unexpected tone threshold, which is based on the amplitudes of the valid tones and the number of amplifiers in the path from encoder to decoder of the expected tones. In a modification to the described embodiments, more than one dynamic unexpected tone threshold may be calculated if required. For example, a separate dynamic unexpected tone threshold may be calculated for each unexpected tone, based on the path of each of the unexpected tones in the network from the encoder to the decoder. Ghosts of the unexpected channels generated by the XGM in amplifiers through which the unexpected tones travel may be modeled individually, with their projected amplitude at the decoder being used to calculate a dynamic unexpected tone threshold.

In yet another modification to the methods described above, for simplicity, each channel signature may include just one dither tone (expected channel signature or expected tone) modulated onto the optical channel. Conveniently, expected locations of expected channel signatures are also recorded, e.g. at selected nodes in the optical network and/or at the NMS.

A corresponding system for compensating for side effects of cross gain modulation in amplified optical networks resulting in the appearance of ghosts tones, and including, e.g. the encoder 110 for marking channel with respective channel signatures and the decoder 180 comprising respective means for detecting and processing the spectrum of tones, will incorporate the steps of the methods described above.

Although specific embodiments of the invention have been described in detail, it will be apparent to one skilled in the art that further variations and modifications may made within the following claims.

What is claimed is:

1. A method for compensating for side effects of cross gain modulation in amplified optical networks, comprising the steps of:
    (a) marking an optical channel traveling in the optical network with a unique channel signature (expected channel signature), comprising at least one dither tone modulated onto the optical channel;
    (b) detecting a spectrum of tones, including said modulated dither tone and ghost tones thereof produced by cross gain modulation in the optical network, at various locations in the optical network;
    (c) comparing amplitudes of the spectrum tones, which belong to the expected channel signature, with a first threshold:
    (d) identifying the spectrum tone as a valid tone if the amplitude of the spectrum tone is exceeding the first threshold;
    (e) generating an alarm that said expected channel signature is missing if the amplitude of the spectrum tone is below the first threshold; and
    (f) comparing amplitudes of the remaining spectrum tones, which are not the valid tones, with a second threshold, the second threshold being lower than the first threshold:
    (g) generating another alarm that an unexpected channel is detected in the network if the amplitude of at least one of the remaining spectrum tones is exceeding the second threshold.

2. A method as described in claim 1, wherein the step (a) of marking comprises marking the optical channel with the unique channel signature comprising two or more dither tones modulated onto the optical channel.

3. A method as described in claim 2, wherein the step of (d) of identifying the spectrum tone as the valid tone comprises identifying the spectrum tone as the valid tone only if the amplitude of all spectrum tones belonging to the expected channel signature is above the first threshold.

4. A method as described in claim 2, wherein the step (e) of generating the alarm comprises generating the alarm that said expected channel signature is missing if the amplitude of at least one of the spectrum tones belonging to the expected channel signature is below the first threshold.

5. A method as described in claim 1, further comprising the step of maintaining a list of all available channel signatures in the optical network, including the expected channel signatures being used in the optical network.

6. A method as described in claim 5, further comprising the step of keeping track of expected network locations associated with the expected channel signatures.

7. A method as described in claim 5, wherein the step (g) of generating another alarm comprises generating another alarm only if the amplitude of all spectrum tones belonging to one of the available channel signatures in the optical network is above the second threshold.

8. A method as described in claim 6, wherein the step (d) comprises identifying the spectrum tone as the valid tone only if the valid tone is detected at the expected network location.

9. A method as described in claim 1, wherein the step (c) of comparing comprises comparing amplitudes of spectrum tones, which belong to the expected channel signature, with the first threshold, whose value is static.

10. A method as described in claim 1, wherein the step (f) of comparing comprises dynamically calculating a value of the second threshold as a function of the optical network parameters and parameters of the detected spectrum of tones.

11. A method as described in claim 10, wherein the step of calculating comprises calculating the value of the second threshold as the function of the identified valid tones in the detected spectrum of tones and a number of optical amplifiers along paths of the valid tones in the optical network.

12. A system for compensating for side effects of cross gain modulation in amplified optical networks, comprising:
    (a) means for marking an optical channel traveling in the optical network with a unique channel signature (expected channel signature), comprising at least one dither tone modulated onto the optical channel;
    (b) means for detecting a spectrum of tones, including said modulated dither tone and ghost tones thereof produced by the cross gain modulation in the optical network, at various locations in the optical network;
    (c) means for comparing amplitudes of the spectrum tones, which belong to the expected channel signature, with a first threshold:
    (d) means for identifying the spectrum tone as a valid tone if the amplitude of the spectrum tone is exceeding the first threshold;
    (e) means for generating an alarm that said expected channel signature is missing if the amplitude of the spectrum tone is below the first threshold; and
    (f) means for comparing amplitudes of the remaining spectrum tones, which are not the valid tones, with a second threshold, the second threshold being lower than the first threshold:

(g) means for generating another alarm that an unexpected channel is detected in the network if the amplitude of at least one of the remaining spectrum tones is exceeding the second threshold.

13. A system as described in claim 12, wherein the means (f) for comparing amplitudes of the remaining tones comprises means for dynamically calculating a value of the second threshold as a function of the optical network parameters and parameters of the detected spectrum of tones.

* * * * *